United States Patent [19]
Tarbouriech

[11] Patent Number: 6,138,918
[45] Date of Patent: Oct. 31, 2000

[54] PORTABLE DATA CARRIER AND METHOD FOR SELECTING OPERATING MODE THEREOF

[75] Inventor: Jean-Claude Tarbouriech, Ville-la-Grind, France

[73] Assignee: Motorlola, Inc., Schaumburg, Ill.

[21] Appl. No.: 09/010,898

[22] Filed: Jan. 22, 1998

[30] Foreign Application Priority Data

Jan. 30, 1997 [GB] United Kingdom .................... 9701853

[51] Int. Cl.[7] .................................................. G06K 19/06
[52] U.S. Cl. ........................................... 235/492; 235/487
[58] Field of Search ....................................... 235/487, 492

[56] References Cited

U.S. PATENT DOCUMENTS 4,931,748  6/1990  McDermott et al. .................... 331/1 A
5,206,495  4/1993  Kraft ........................................ 235/492

FOREIGN PATENT DOCUMENTS 0 337 684 A2  10/1989  European Pat. Off. ....... G06K 19/06

*Primary Examiner*—Harold I. Pitts

[57] ABSTRACT

A portable data carrier, suitable for operation in either a contacted or a contactless mode, includes a clock signal input pad and a clock detection circuit. The clock input pad includes an output that is coupled to a selection circuit having a first input and a second input. An input for the selection circuit is coupled to the output of the clock detection circuit. The microprocessing unit follows the clock being transmitted via the clock input pad in the contacted mode of operation if the clock detection circuit confirms presence of such a clock signal. Otherwise, the contactless mode of operation is chosen, where the microprocessing unit follows a radio frequency clock.

10 Claims, 2 Drawing Sheets

PORTABLE DATA CARRIER AND METHOD FOR SELECTING OPERATING MODE THEREOF

FIELD OF THE INVENTION

The present invention is generally related to portable data carriers that are operational in either contacted mode or contactless mode, and more specifically the method of selecting between such modes.

BACKGROUND OF THE INVENTION

Portable data carriers (e.g., smart cards or chip cards) are known to include a plastic substrate within which a semiconductor device (i.e., integrated circuit—IC) is disposed for retaining digital data. This digital data may constitute program instructions, user information, or any combination thereof. Moreover, these smart cards are known to be operational in a contacted mode, whereby an array of contact points disposed on the plastic substrate and interconnected with the semiconductor device is used to exchange electrical signals between the smart card and an external card reader, or terminal. Similarly, there exists smart cards that operate in a contactless mode, whereby a radio frequency (RF) receiving circuit is employed to exchange data between the card and a card terminal. That is, the card need not come into physical contact with the card terminal in order to exchange data therewith, but rather must simply be placed within a predetermined range of the terminal.

Additionally, there exist smart cards that are alternatively operational in either a contacted mode or a contactless mode. Such cards are equipped with both RF receiving circuitry (for contactless operations) as well as an array of contact pads (for contacted operations). These cards are commonly referred to as combination smart cards, or combi-cards. It should be noted that in both the contacted smart card and the combi-card arrangements, the array of contact pads typically conform to the International Standard ISO 7816, which standard is incorporated herein by reference.

In practice, combi-cards are limited to use in either the contacted mode of operation or the contactless mode of operation. Accordingly, it is desirable to quickly and reliably determine which mode of operation is intended. Upon detection of the intended operating mode, the processing element (typically embodied in the semiconductor device) is able to correctly process the incoming and outgoing electrical signals.

One mode detection scheme is described in U.S. Pat. No. 5,206,495, issued on Apr. 27, 1993, and assigned to Angewandte Digital Elektronik (ADE). This reference describes a combi-card that includes a switching element device coupled between the semi-conductor device and the ISO Standard 7816 contacts and transmission coils. As described, the selection method includes a comparison of supply voltages received on the supply contact and the power received from the transmission coils. When a voltage is detected from the transmission coil, it is assumed that the contactless mode is intended, and the selection of contactless mode is made. While this arrangement may be suitable in some applications, it may be unreliable in an unstable RF environment (i.e., where stray RF signals are present). Moreover, this solution is not secure in the sense that it can easily be compromised by an unscrupulous user of the smart card.

Accordingly, there exists a need for a combination smart card that can reliably detect whether a contacted or contactless mode of operation is intended. Further, such a method that would provide a redundant check for added security would be an improvement over the prior art.

DETAILED DESCRIPTION OF A PREFERRED EMBODIMENT

The present invention encompasses a combination smart card and method for properly selecting a clock signal for use thereby. According to the invention, a clock detector is coupled to an ISO clock pad on the combination smart card. This clock detector is further coupled to a selection circuit and a memory element for use in properly selecting the clock circuit and storing information that characterizes that selection, respectively. In this manner, the present invention allows for a reliable, secure method of selecting the proper clock signal independent of whether a contacted or contactless mode of operation is intended.

Figure 1:
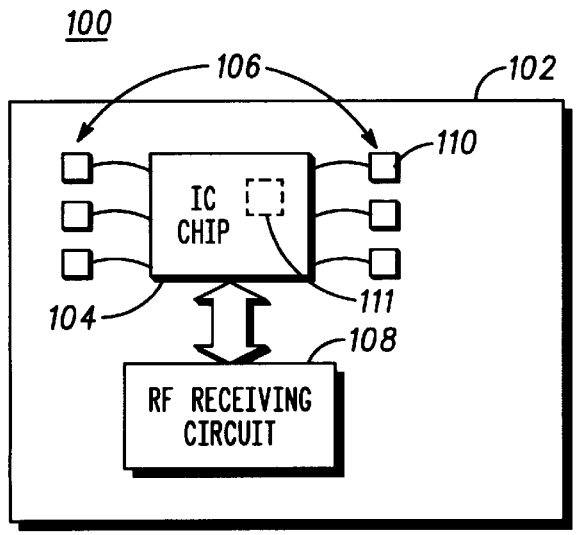
FIG. 1 shows a combination smart card, in accordance with the present invention.

The present invention can be best described using the illustrations set forth in FIGS. 1–5. FIG. 1 shows a combination smart card 100, in accordance with the present invention. Such smart cards are conventionally manufactured using a plastic substrate 102 having disposed thereon an integrated circuit 104, as shown. Electrically connected to the integrated circuit 104 is a plurality of contact pads 106, which typically conform to the International Standard ISO 7816. A radio frequency (RF) receiving circuit 108 is used to gather RF signals emitted for use by the combination smart card 100. In its simplest form, the RF receiving circuit 108 may comprise an antenna disposed peripherally about the plastic substrate 102. One of the contact pads 106, is used for importing an externally generated clock signal in the contacted mode of operation.

Figure 1A:
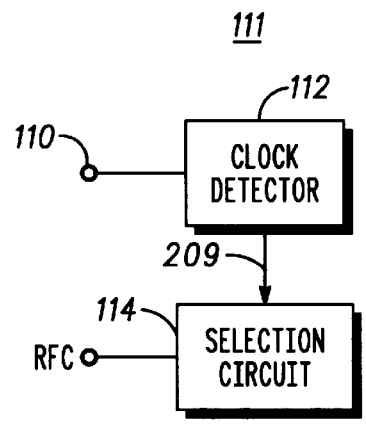
FIG. 1A shows a more detailed view of a clock detection/selection circuit shown in FIG. 1.

FIG. 1A shows a more detailed view of a clock detection/selection circuit 111 shown in FIG. 1. A clock signal input pad 110, is connected to a clock detector 112, which processes the voltage presented thereat, as later described. An output 209 of the clock detector 112 goes to a selection circuit 114, which is used to properly select the clock signal for use by the processing unit, as later described. The selection circuit 114 also has coupled to it an RF clock input (RFC), as shown, whose use is described later with reference to FIG. 3.

Figure 2:
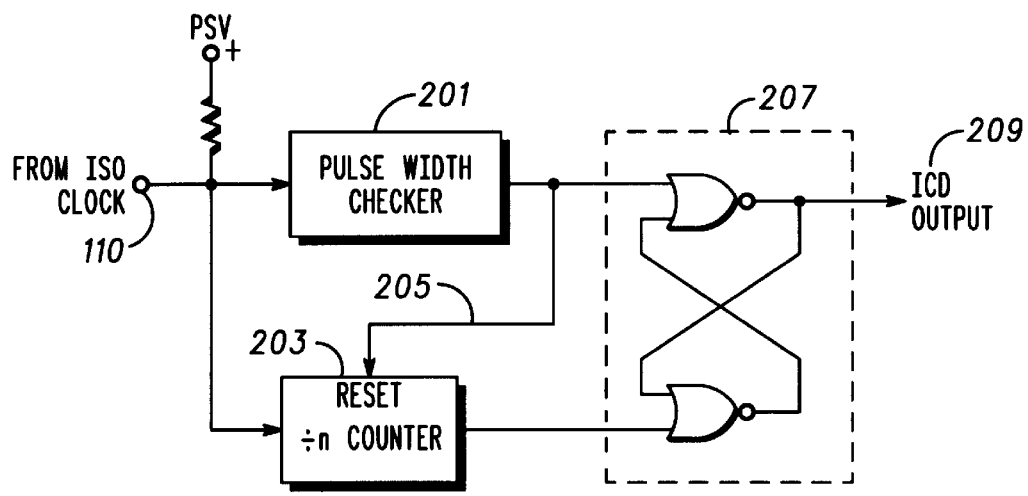
FIG. 2 shows a more detailed schematic diagram of the clock detector circuit shown in FIG. 1.

FIG. 2 shows a more detailed block diagram of the clock detector 112 shown in FIG. 1. As illustrated the ISO clock input 110 is inputted to a pulse width checker 201 and a divide-by-n counter 203. It should be noted that the ISO clock input 110 is also coupled to a pull up resistor to ensure proper operation of the clock detection circuit 112. An output 205 of the pulse width checker 201 is coupled to the reset line of the divide-by-n counter 203. A latch circuit 207 is operably coupled to the pulse width checker 201 and divide-by-n counter 203, as shown, to provide a stable output representing the presence of the ISO clock signal.

The ISO clock detection (ICD) output 209 is provided to represent the condition whereby an external device is providing a clock signal to the combination smart card 100. In a preferred embodiment, the pulse width checker 201, determines whether or not the input signal falls within a pre-determined frequency range (e.g., 300 KHz–5 MHz). This determination can be made by measuring the marks and spaces of the incoming signal and comparing these measured values with the known period ranges for the pre-determined frequencies, as is well known. The value of "n" in the counter 203 can be chosen so as to appropriately balance the requirement for accuracy and speed. That is, higher values of n will provide a more accurate frequency determination, but will, of course, require more clock cycles to implement. In a preferred embodiment, the value of "n" is set to 5. In this manner, a reliable frequency determination can be made without unduly sacrificing valuable processor cycles.

Figure 3:
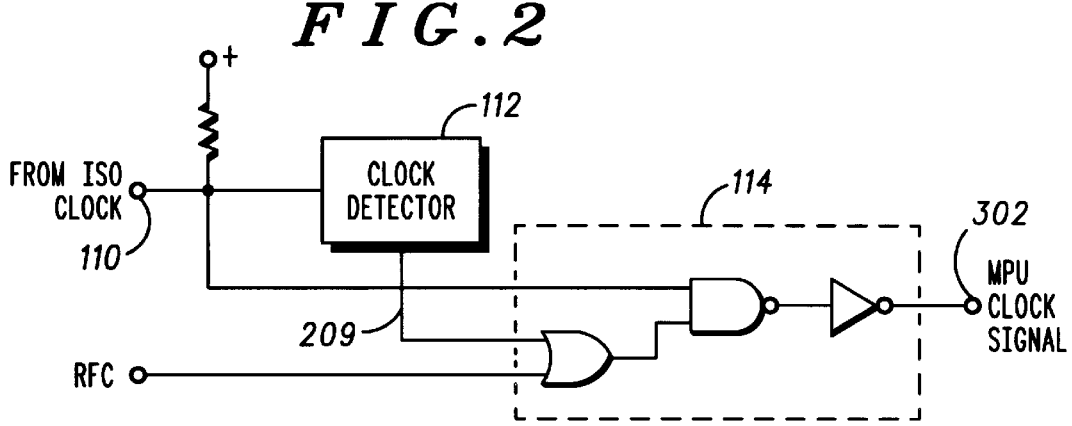
FIG. 3 shows a simplified diagram detecting a clock selection scheme, in accordance with the present invention.

FIG. 3 shows a clock signal selection scheme for use by a combination smart card 100, in accordance with the present invention. As described with reference to FIG. 2, the ISO clock signal 110 is coupled to a pull up resistor and is inputted to the clock detector 112 and the selection circuit 114. The RFC signal is also inputted to the selection circuit 114, as shown, and is processed along with the ISO clock signal 110 using simple combinational logic as depicted. It will be apparent to the skilled artisan that the MPU clock signal 302 will follow the ISO clock signal 110, if detected, and will follow the RFC if no ISO clock is detected. It is important to note that the present invention, while quickly and reliably determining which clock signal is to be used, also makes substantially immediate use of that proper clock signal. That is, MPU clock signal 302 immediately carries the appropriate clock signal, without the delays that are typical in prior art implementations. Such a quick response time proves advantageous, particularly in the area of low power applications such as Smartcards, where processing delays adversely affect performance.

Figure 4:
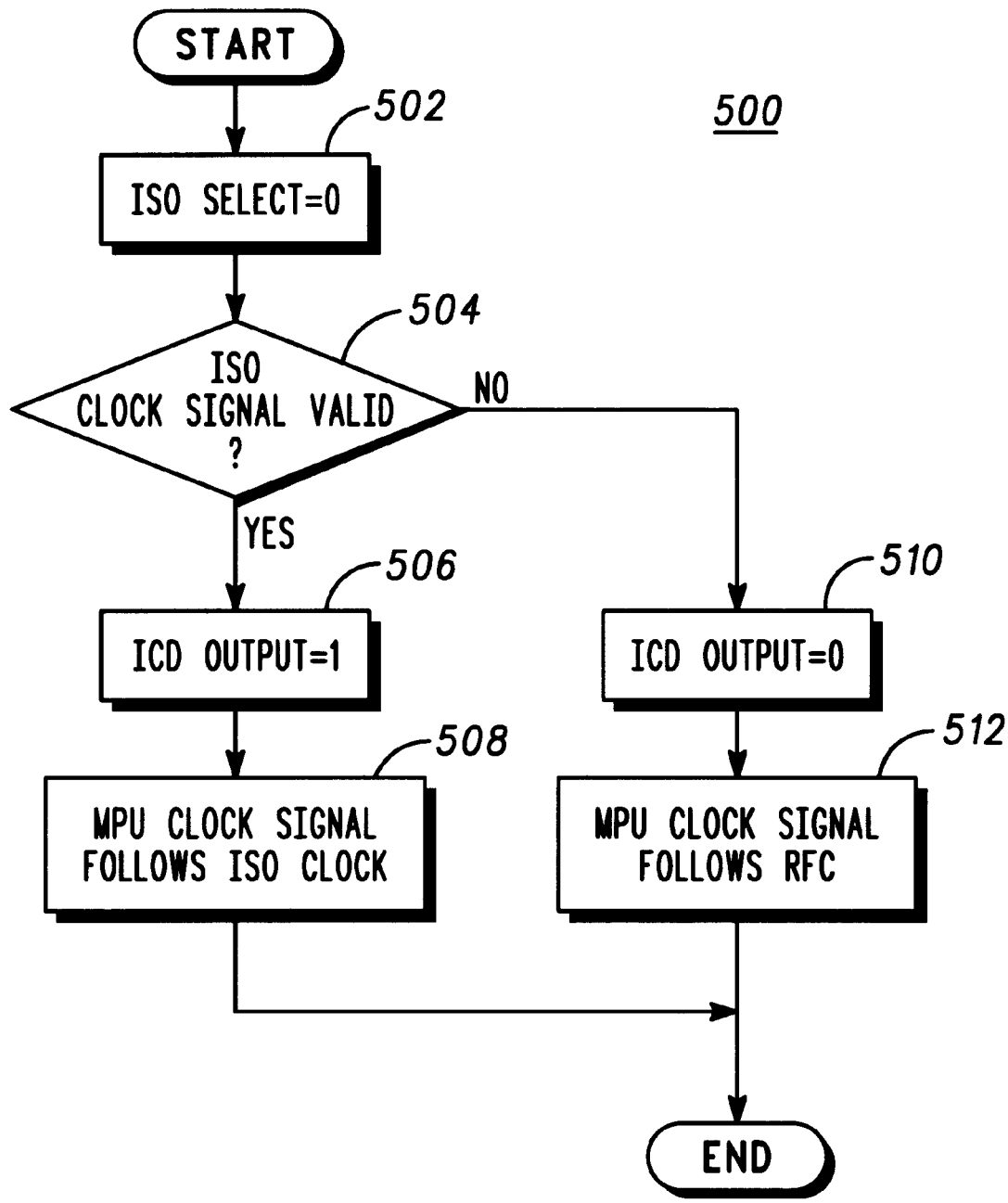
FIG. 4 shows a flow diagram depicting the operation of the combination smart card, in accordance with the present invention.

FIG. 4 shows a flow diagram 500 depicting the clock select function of the combination smart card. The ISO select bit is initialized (502) to a logic zero—indicating a contactless mode of operation. A test (504) is then reached to determine whether or not the ISO clock signal being received (by the clock detector 112 shown in FIG. 1) is valid. The ISO clock signal is determined to be valid if the pulse width is within a pre-determined range over a pre-determined number of clock pulses, as described with reference to FIG. 2. If the ISO clock signal is determined to be valid, the ISO clock detector output goes high (506), and the MPU clock signal follows (508) the ISO clock signal presented at pin 110 shown in FIG. 1. If the clock signal is determined to be absent or invalid, the ICD output goes low (510) and the MPU clock signal follows (512) the RF clock signal, and the routine is exited.

What is claimed is:

1. A portable data carrier capable of operating in a contacted mode or a contactless mode via receipt of radio frequency signals, the portable data carrier comprising:

a clock signal input pad;

a clock detection circuit, having an input operably coupled to the clock signal input pad and an output;

a selection circuit having a first input and a second input, the first input operably coupled to the output of the clock detection circuit; and a processing unit which operates in either the contacted mode or the contactless mode in response to an output of the selection circuit.

2. The portable data carrier of claim 1, wherein the clock detection circuit comprises:

a pulse width checker operably coupled to the clock input pad;

a divide-by-n counter operably coupled to the clock input pad and an output of the pulse width checker; and a latch circuit, operably coupled to the output of the pulse width checker and an output of the divide-by-n counter.

3. The portable data carrier of claim 1, further comprising a control register operably coupled to the clock detection circuit.

4. The portable data carrier of claim 1, wherein the control register comprises a read-only portion and a read/write portion.

5. A portable data carrier having an integrated circuit which is capable of operation in both a contacted mode and a contactless mode, the integrated circuit comprising:

a clock detection circuit operably coupled to a clock signal input pad of the portable data carrier and generating a clock detection output; and a processing unit which utilizes one of either a clock signal generated by a device external to the portable data carrier as received through the clock signal input pad or a radio frequency clock signal, depending upon the clock detection output.

6. The portable data carrier of claim 5 wherein the clock detection circuit comprises a pulse width checker operably coupled to the clock input pad.

7. The portable data carrier of claim 6 further comprising a divide-by-n counter operably coupled to the clock input pad and an output of the pulse width checker.

8. The portable data carrier of claim 7 further comprising a latch circuit, operably coupled to the output of the pulse width checker and an output of the divide-by-n counter.

9. In a combination portable data carrier operational in a contacted mode and a contactless mode, a method of selecting between the contacted mode and the contactless mode of operation, the method comprising the steps of:

detecting a first clock signal intended for use in the contacted mode of operation, thereby producing a clock detector output; and using said clock detector output to select between the contacted mode and the contactless mode of operation.

10. The method of claim 9, further comprising the steps of:

detecting a second clock signal intended for use in the contactless mode of operation; and processing the first clock signal, the clock detector output and the second clock signal to provide a usable clock signal for the combination portable data carrier.

* * * * *